(12) United States Patent
Mackey

(10) Patent No.: US 11,186,305 B2
(45) Date of Patent: *Nov. 30, 2021

(54) RAIL CAR MOBILE SERVICING APPARATUS

(71) Applicant: Melvin Mackey, Bakersfield, CA (US)

(72) Inventor: Melvin Mackey, Bakersfield, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,528

(22) Filed: Nov. 7, 2019

(65) Prior Publication Data

US 2020/0070864 A1    Mar. 5, 2020

Related U.S. Application Data

(63) Continuation-in-part of application No. 16/298,977, filed on Mar. 11, 2019, now Pat. No. 10,471,972.

(60) Provisional application No. 62/641,090, filed on Mar. 9, 2018.

(51) Int. Cl.
| | |
|---|---|
| *B62B 3/02* | (2006.01) |
| *B60F 1/04* | (2006.01) |
| *B62B 3/10* | (2006.01) |
| *B65G 67/20* | (2006.01) |

(52) U.S. Cl.
CPC ............... *B62B 3/02* (2013.01); *B60F 1/04* (2013.01); *B62B 3/10* (2013.01); *B65G 67/20* (2013.01); *B62B 2202/10* (2013.01); *B62B 2203/10* (2013.01); *B62B 2203/70* (2013.01); *B62B 2206/003* (2013.01); *B62B 2206/06* (2013.01); *B62B 2301/02* (2013.01); *B62B 2301/04* (2013.01); *B62B 2301/08* (2013.01); *B62B 2301/25* (2013.01)

(58) Field of Classification Search
CPC ........... B62B 5/0003; B66F 7/065; B66F 9/06
See application file for complete search history.

(56) References Cited

U.S. PATENT DOCUMENTS

| | | | |
|---|---|---|---|
| 8,505,934 B2 * | 8/2013 | Rodney ..................... | B25H 5/00 280/47.131 |
| 9,315,201 B2 * | 4/2016 | Wellman .................. | B61D 7/30 |

* cited by examiner

*Primary Examiner* — Bryan A Evans
(74) *Attorney, Agent, or Firm* — James M. Duncan; Scanlon Duncan LLP

(57) ABSTRACT

A manually manipulated apparatus supports a piece of equipment beneath a rail car gate of a railroad hopper car during maintenance or removal of the gate. The apparatus has a frame and a support frame attached to the frame. The support frame is selectively raisable and lowerable between a lowered position adjacent to the frame to a raised position extending upwardly above the frame. The support frame has an equipment engagement member which has an upwardly facing surface which is adapted to engage a downwardly facing surface of the equipment when the support frame is in the raised position.

20 Claims, 14 Drawing Sheets

RAIL CAR MOBILE SERVICING APPARATUS

RELATED APPLICATIONS

This application claims domestic priority to U.S. provisional application 62/641,090 filed Mar. 9, 2018 and to U.S. application Ser. No. 16/298,977 filed on Mar. 11, 2019, and issued as U.S. Pat. No. 10,471,972 on Nov. 11, 2019

BACKGROUND OF THE INVENTION

Rail cars utilized for shipment of goods and materials require periodic maintenance. Among such cars are boxcars, tank cars, gondola cars, intermodal cars, and hopper cars. Maintaining the underside components of the cars can be complicated because of the limited clearance between the rails and the undersides of the cars and because the underside components of the cars are typically very heavy. Hopper cars and other rail cars have other heavy components on the underside of the cars which occasionally require servicing. For example, between the coupler and the frame of all rail cars are draft gears and cushioning units which cushion the impact when the car is coupled to prevent damage to the car or the car contents. Draft gears and cushioning units weigh several hundred pounds. Tanker cars may have bottom outlet valves which are also very heavy. Hopper car gates and related components are likewise very heavy and require periodic maintenance.

Hopper cars provide an example of the challenges presented in maintaining the underside of a rail car. A hopper car is a railroad freight car which is utilized to transport loose bulk commodities, such as grain, sugar, sand, ores, cement, gravel, fertilizer and other bulk commodities. Hopper cars typically have an enclosure which tapers downward to funnel the bulk material to the bottom of the car for discharge. At the bottom of the enclosure is a discharge chute or gate which is typically attached to a steel adapter frame at the bottom of the hopper car. The discharge gate is opened to unload the transported material. Alternatively, if the transported materials is unloaded in a different manner (for example, some hopper cars are emptied with vacuum hoses which attach to outlets at the bottom of the car), it may still be necessary to open the gate to clean out the enclosure after the material has been removed. The gates may be opened either by mechanical or pneumatic operation.

The gates are typically constructed of steel, aluminum or stainless steel and may be either bolted on or welded to the bottom of the hopper car. Because of the construction material, the gate assemblies are typically very heavy. The gates typically have a "v" profile pointing toward the ground. Typically, the gate is secured to the steel adapter frame by a large number of large bolts, usually 32 bolts.

Correct functioning of the hopper gate requires that the gate mechanism and the components of the hopper car adjacent to the gate be periodically serviced. Servicing of the gate typically requires that the gate itself be disconnected from the steel adapter frame. Sometimes the gate and adjacent components can be serviced merely by removing all of the attachment bolts and lowering the hopper gate from the hopper car. At other times the entire gate mechanism must be separated from the hopper car and transported elsewhere for servicing. In either case, it is necessary to separate the hopper gate from the hopper car.

Because hopper gates, draft gear, valving and other underside components of rail cars are typically very heavy, safeguards must be taken to prevent injury to personnel and equipment when these devices are separated from the rail car car. The situation is complicated by the limited clearance between the bottom of the rail car—forming an upper barrier—and the ground surface and railroad rails—forming a lower barrier. Service people performing maintenance on rail cars must therefore work within this relatively cramped space between the upper barrier and lower barrier on a heavy and bulky device.

Utilizing a hopper gate as an example, a typical method of working on the hopper gate is to utilize two people and a fork lift. One person operates the fork lift, and positions the forks, typically with a pallet spanning the forks, underneath the gate, prepared for the weight of the hopper gate to be supported by the pallet once all of the bolts attaching the hopper gate to the hopper car are removed. The second person utilizes a tool to remove the approximately 32 bolts (or nuts as the case may be) which hold the hopper gate in position.

The known method described above is inefficient in that it requires at least two persons and a fork lift. The fork lift operator may spend a significant amount of time simply waiting on the other persons to remove the fasteners which secure the hopper gate to the bottom of the car. However, it is important that the fork lift operator stay at the fork lift controls during this operation. The pallet may require repositioning as bolts are removed. Moreover, when the gate comes loose and its weight fully supported by the pallet, the load might shift thereby requiring adjustment in the fork position or lowering of the forks to protect persons near the hopper gate and to prevent damage to the gate.

As also suggested above, the known method presents potential physical hazard to the person who removes the bolts which hold the very heavy gate to the bottom of the hopper car. For example, as bolts are removed from the gate, the load of the gate is transferred to the remaining bolts, with the full load distributed to the remaining bolts. If any of the remaining bolts is defective and fails, the gate could fall to the pallet and roll off, presenting a risk to nearby personnel. Moreover, as stated above and shown in FIG. 1, the gates typically have a "v" profile pointing toward the ground, but the pallets are flat. Therefore, once the load of the gate is transferred from the bolts to the pallet, the gate may shift on the pallet and potentially fall off of the pallet.

The servicing of other heavy components on the underside of rail cars, including cushioning units, draft gears, valves, etc. presents similar challenges.

A device and a method which provides for the safe removal of heavy components from the underside of rail cars is therefore desirable. A device and method which also allows for a reduction in personnel required for the removal of such equipment is also desirable.

SUMMARY OF THE INVENTION

Embodiments of the present invention provide a solution to the need described above. An embodiment of the presently disclosed invention may have wheels, rollers, legs, skids or other support structures, which change position to lower the overall height of the apparatus, which may be referred to as a trolley, so it can fit between the hopper gate or other piece of equipment on the top side and the track bed and rails on the bottom side. The portion of the trolley first inserted below the piece of equipment is arbitrarily referred to as the "front", while the opposite end is arbitrarily referred to as the "back" or "rear". The wheels, rollers, legs, skids or other support structures at the front of the trolley may be independently adjusted with respect to the same structures located at the rear of the trolley and vice versa. Once in position, the elevation of the front of the trolley and the rear of the trolley may be adjusted as desired to bring the gate support structure of the trolley in the needed position with respect to the position of the hopper gate or other piece of equipment.

An embodiment of the present invention comprises a frame comprising a front member, wherein the front member is selectively pivotable or rotatable from a first position to a second position, and a rear member which is selectively pivotable from a primary position to a secondary position. A support frame is connected to the frame, where the support frame is selectively raisable and lowerable between a low position adjacent to the frame to a high position extending upwardly above the frame. An equipment engagement member is mounted to the raisable support frame, where the equipment engagement member comprises an upwardly-facing surface which is adapted to engage a downwardly-facing surface of the equipment when the support frame is in the high position. A first actuation mechanism is engaged to pivot the front member from the first position to the second position. Likewise, a second actuation mechanism moves the rear member back and forth between the primary position and the secondary position.

An embodiment of the invention may have a pair of ground engaging wheels attached to the front member and a pair of ground engaging wheels attached to the rear member. Either pair of wheels may be pivotable for ease of controlling the travel direction of the trolley. Alternatively, the front member may comprise other ground-engaging structures such as rollers, skids, or telescoping legs. Likewise, the rear member may comprise similar ground-engaging structures.

The embodiment further comprises a first actuation mechanism which moves the front member from the first position to the second position, and from the second position to the first position. Likewise, a second actuation mechanism moves the rear member from the primary position to the secondary position and from the secondary position to the primary position. An upwardly extending handle may be attached to the frame adjacent to the rear member.

An embodiment of the invention may utilize a jack to raise and lower the support frame. The jack may have a base attached to the frame. The jack may further comprise lower arms and upper arms, the lower arms attached to the base and the upper arms attached to the support frame. The jack may further comprise a screw member which, upon rotation raises the upper arms relative to the base.

The jack which may be utilized with various embodiments of the apparatus may be a scissor-type jack having two lower members pivotably attached to two upper members, where a screw member causes the two upper members to be raised as the screw member is rotated. A support plate or frame is attached to the upper two members so that the support plate or frame is raised as the two upper members are raised.

Embodiments of the apparatus may further utilize a motor for rotating the screw member. Embodiments of the apparatus may also utilize a motor for propelling the trolley, such as by causing wheels attached to the device to rotate. While embodiments of the apparatus may be manually positioned, in some situations, such as where the rail car equipment needs to be moved a significant distance, transporting the equipment may be facilitated by a trolley which has drive wheels.

For embodiments of the apparatus having wheels, the rear wheels of the trolley (arbitrarily designated as those closest to the handle member) may be pivotable to provide increased maneuverability. This embodiment may further comprise a braking mechanism which may be applied to one or all wheels of the apparatus to secure the device in position.

It is to be appreciated that the equipment engagement member of the present invention may be configured to match the profile of the piece of equipment. For example, with respect to hopper gates, the equipment engagement member may comprise a saddle member which is profiled to correspond with the downward facing surface of most hopper gates, such that the hopper gate is received by the saddle member and supported. In addition, embodiments of the present invention may have pivotable support arms which may pivot into position such that a portion of the support arm engages a portion of the rail car equipment to provide additional support. Once the equipment engagement member and the pivotable support arms are positioned in engaging contact with the rail car equipment, and any wheels on the trolley are locked, the equipment is sufficiently secured to allow the removal of any bolts or fasteners which attach the equipment to the rail car.

In operating the present device, a single person may position the trolley beneath the rail car equipment and raise the equipment engagement member until it is directly engaging the rail car equipment. The open-frame configuration of the present device provides access for the person to gain access to bolts or fasteners holding the equipment in position even when the engagement member has fully engaged the bottom of the piece of equipment. This configuration allows a single person to service the equipment and does not require the use of a fork lift in the operation.

DETAILED DESCRIPTION OF THE INVENTION

Figure 1:
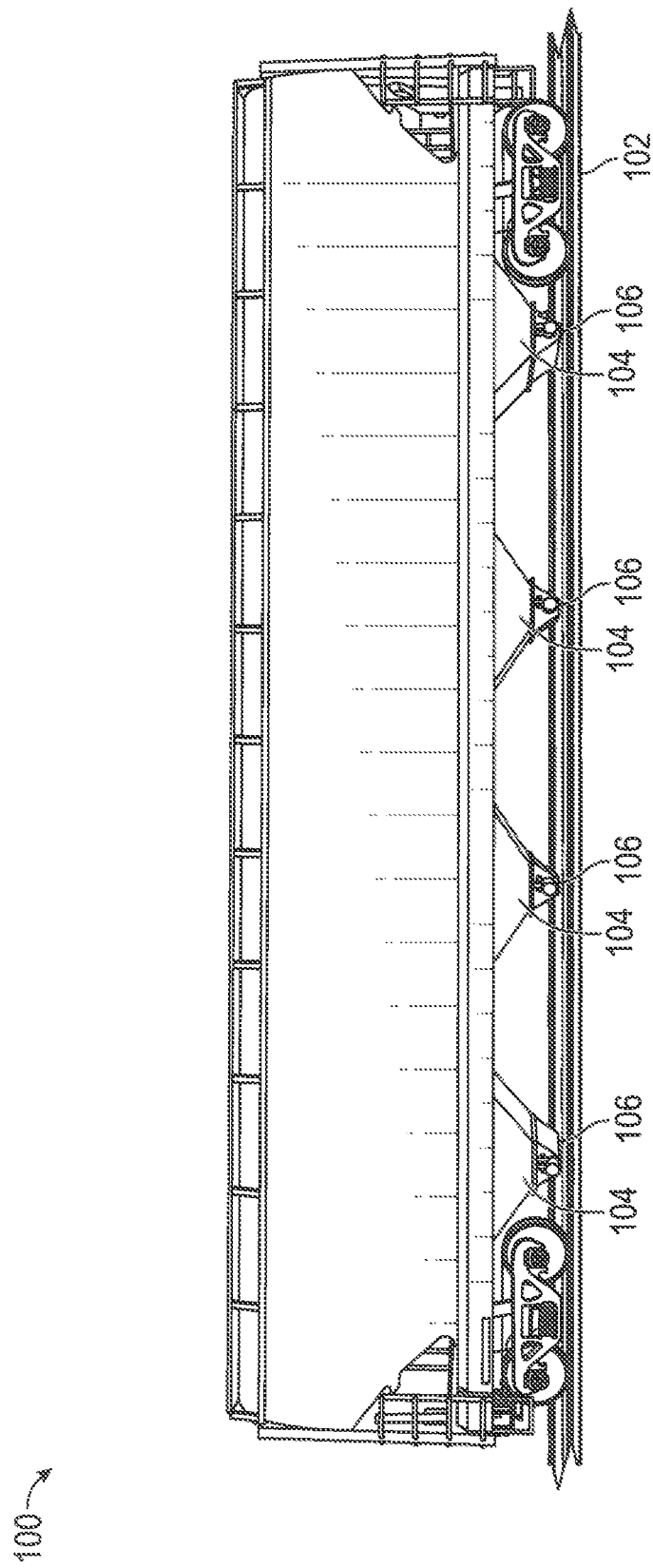
FIG. 1 depicts one variety of hopper car having a V-door hopper gate.
Figure 2:
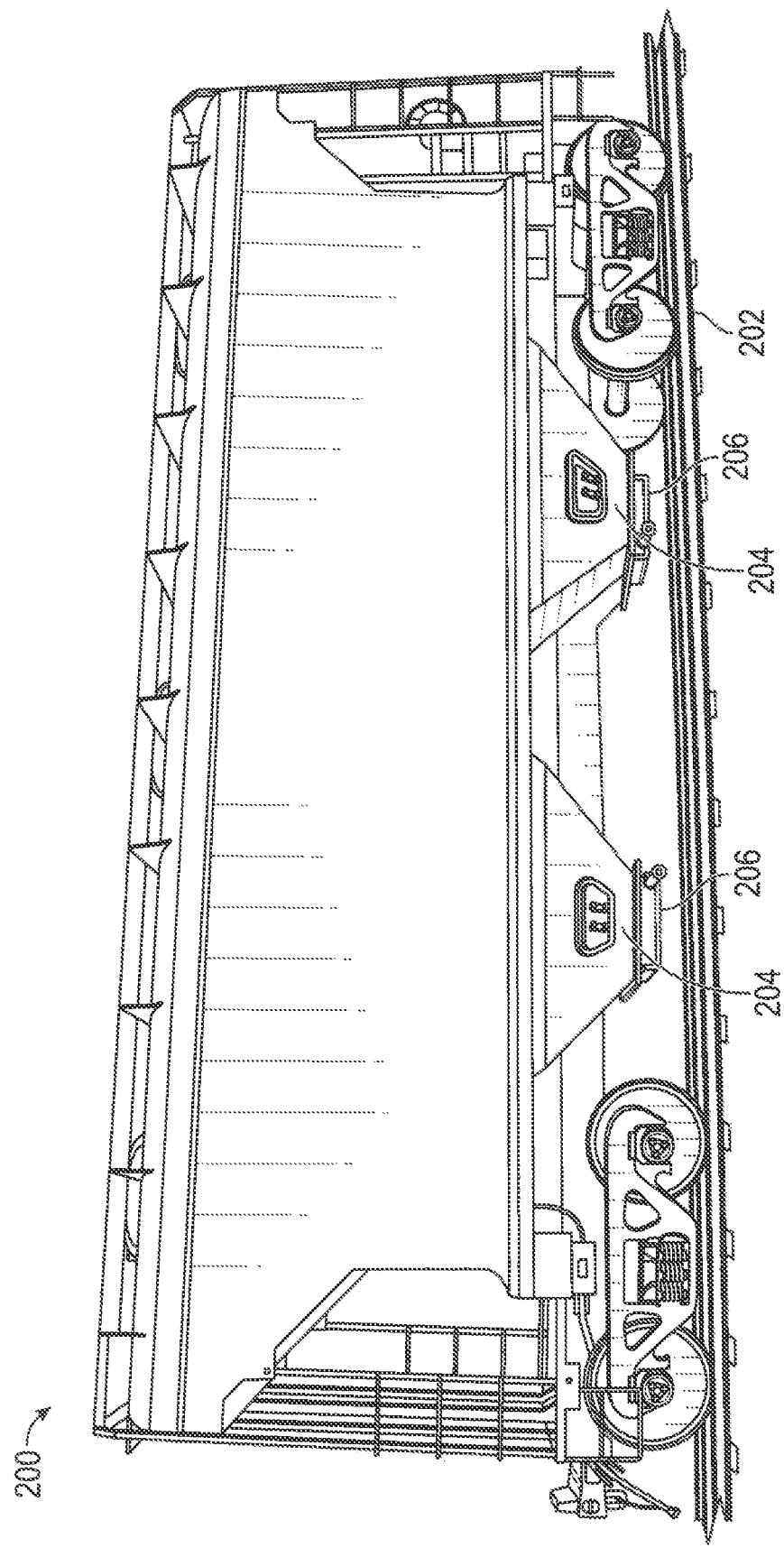
FIG. 2 depicts another variety of hopper car having a flat bottom hopper gate.

Referring now to the figures, FIG. 1 shows a first type of a hopper car 100 having V-bottom gates 104. Hopper car 100 is sitting on track rails 102. FIG. 2 shows a second type of a hopper car 200 sitting on track rails 202 having flat bottom gates 204. It is to be appreciated that there is limited space between the hopper gates 104, 204 and the track rails 102, 202 making it difficult to access the hopper gates and perform maintenance. Embodiments of the present invention work with V-bottom gates 104 and flat bottom gates 204 as well as with supporting, maintaining, lowering and raising other equipment attached at the bottom and ends of rail cars.

Figure 3:
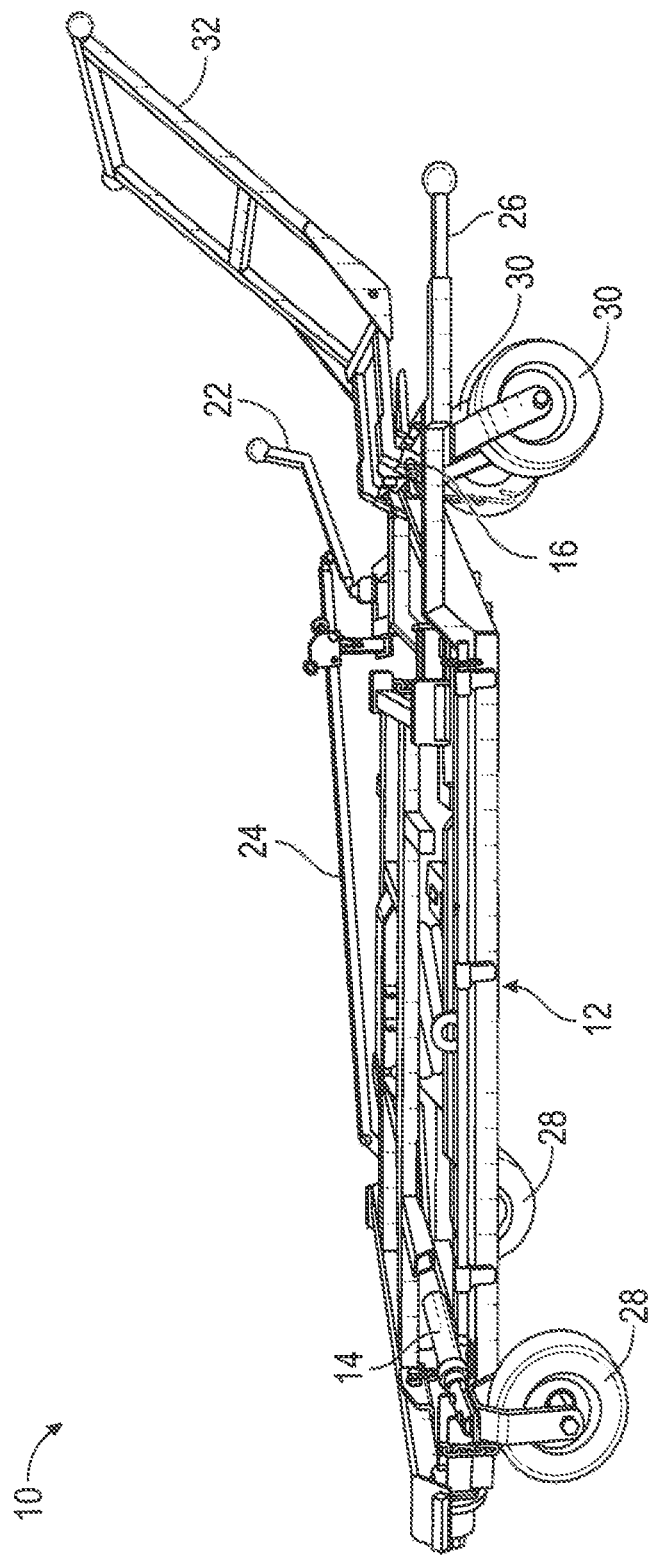
FIG. 3 depicts a side view of an embodiment of the present invention having front wheels and back wheels in a raised position.

FIG. 3 shows an embodiment of the presently disclosed rail car mobile servicing apparatus lift ("servicing lift") 10. As shown in the Figure, the servicing lift 10 comprises a frame 12. Frame 12 comprises a front member 14, a rear member 16, and a plurality of interconnected rail members 18. Front member 14 is selectively pivotable from a first position to a second position. Likewise, rear member 16 is selectively pivotable from a primary position to a secondary position. FIG. 3 depicts the front member in the first position and the rear member in the primary position. has two front wheels 16 attached to it.

Figure 4:
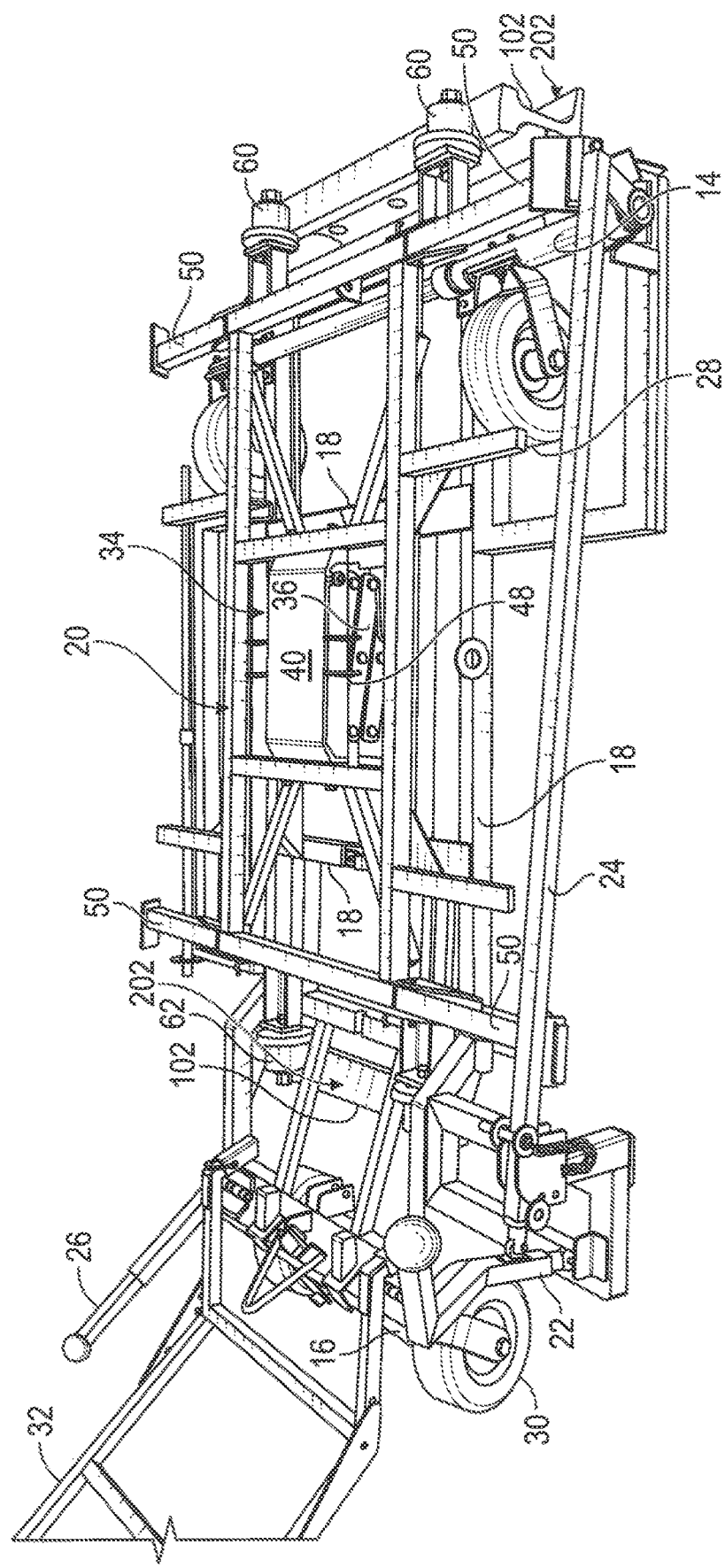
FIG. 4 depicts an oblique top view of an embodiment of the present invention.

The servicing lift further comprises a support frame 20 which is connected to frame 12 by members which allow support frame 20 to be raised relative to frame 12. The support frame 20 is selectively raisable and lowerable from a lowered position adjacent to frame 12 to a raised position. Support frame 20 comprises an equipment engagement member 34 which has an upwardly facing surface 40. Upwardly facing surface 40 is adapted to engage a downwardly facing surfaces 106, 206 of V-bottom gates 104, flat bottom gates 204 and the surfaces of other heavy detachable equipment mounted to the undersides and sides of a rail car, such as draft gear, valve components, etc. FIGS. 3-4 depict the support frame in the lowered position.

Figure 8:
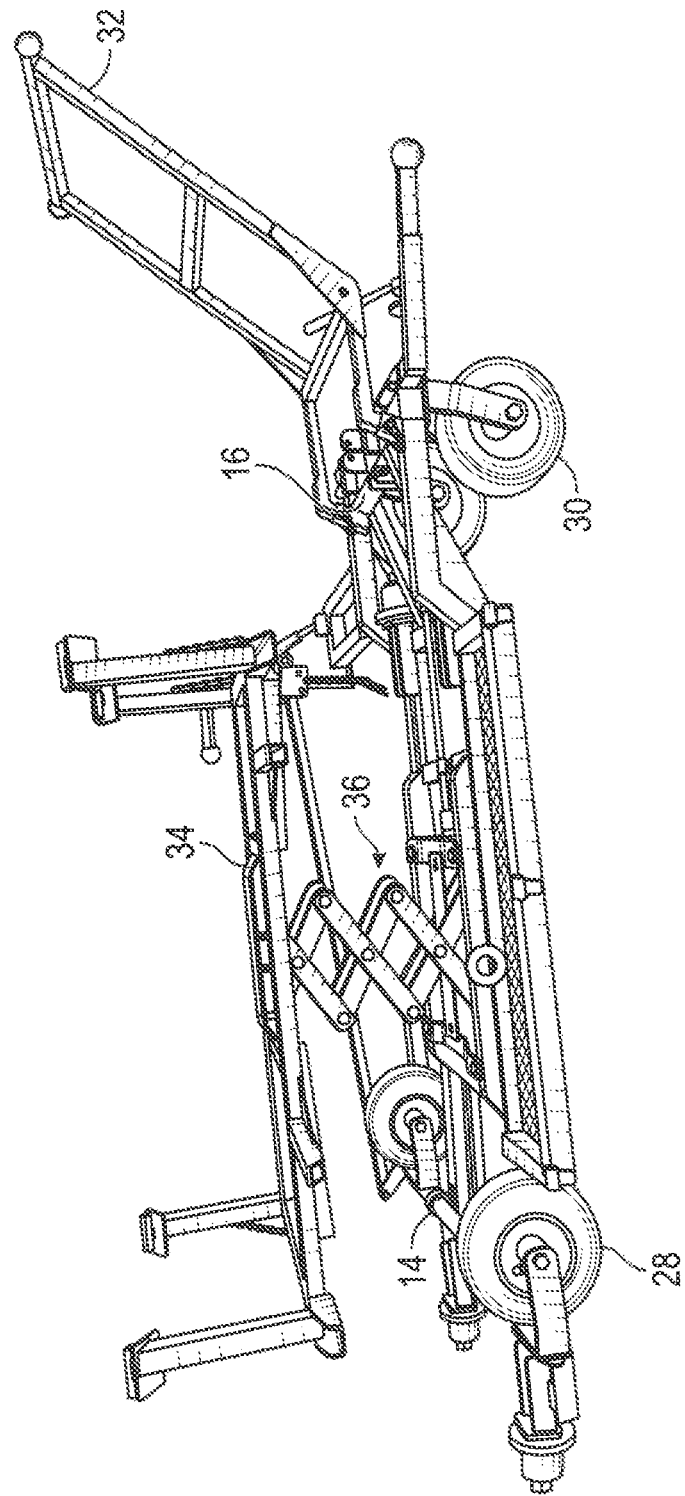
FIG. 8 depicts a side view of an embodiment of the present invention with the front wheels in a lowered position, with the support frame in a raised position, and with vertical side supports in a raised position.
Figure 9:
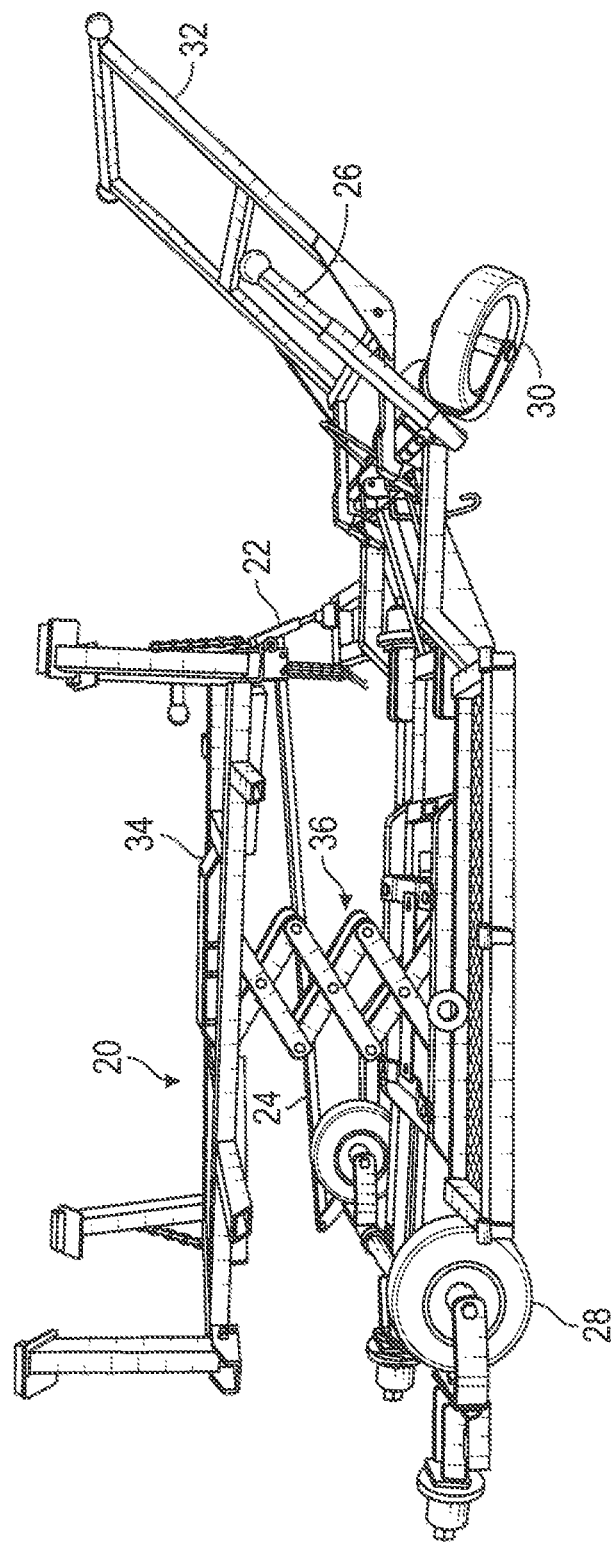
FIG. 9 depicts a side view of an embodiment of the present invention with the front wheels in a lowered position, the rear wheels in a lowered position, with the support frame in a raised position, and with vertical side supports in a raised position.
Figure 10:
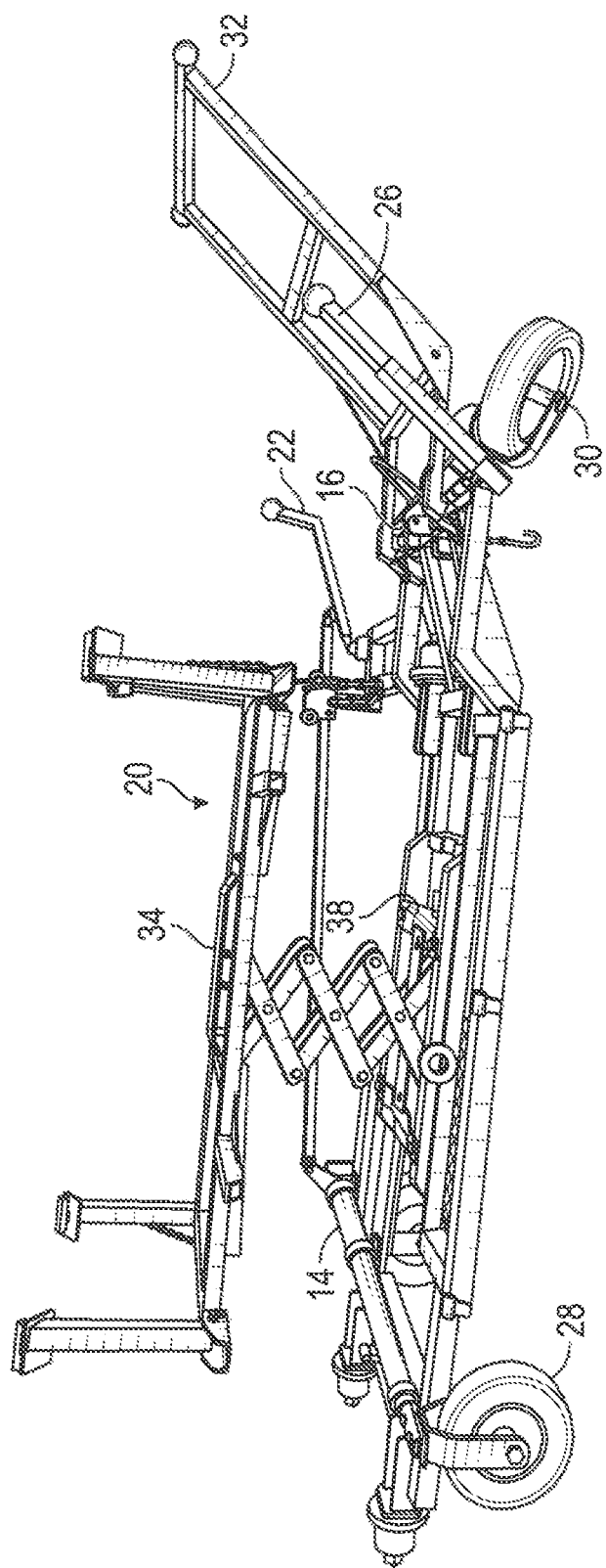
FIG. 10 depicts a side view of an embodiment of the present invention with the front wheels in a raised position, the rear wheels in a lowered position, with the support frame in a raised position, and with vertical side supports in a raised position.
Figure 11:
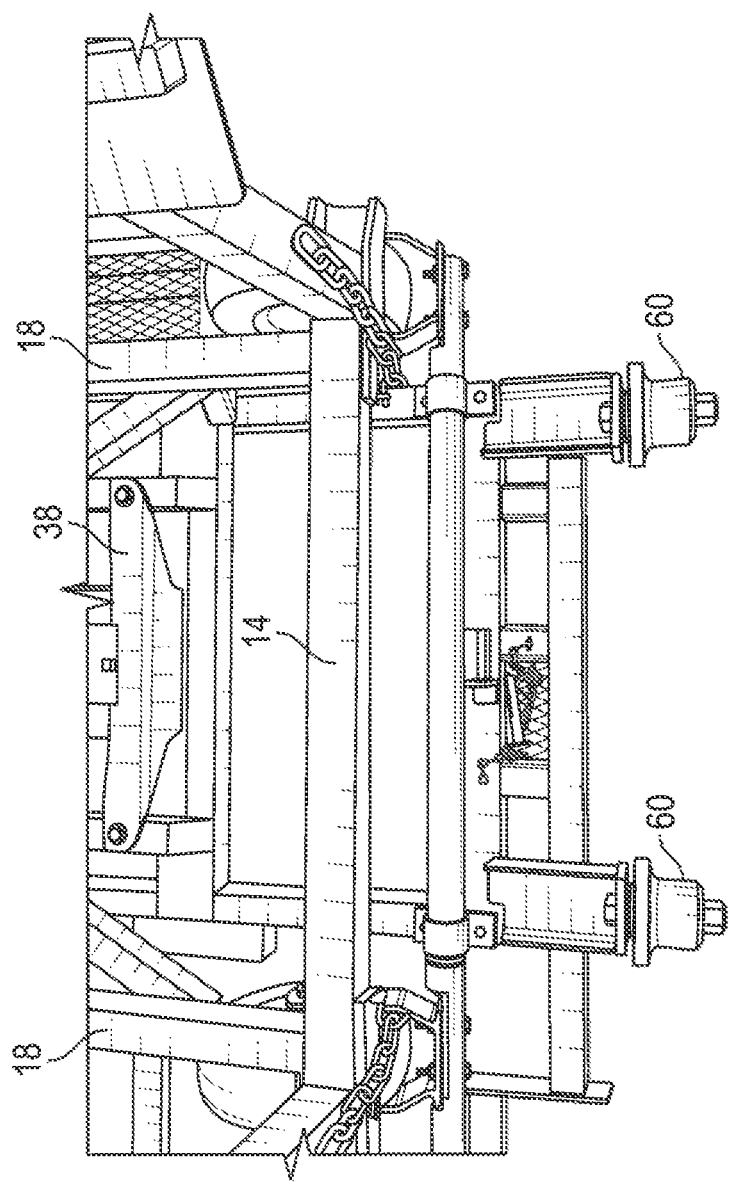
FIG. 11 depicts a front view of an embodiment of the present invention showing track wheels which allow lateral movement of the apparatus along a track rail when the front wheels are in a raised position.

An actuation lever 22 is attached to linkage 24 connected to front member 14. Actuation of actuation lever 22 shifts the position of front member 14 with respect to frame 12 causing front member 14 to move the second position, resulting in the lowering of the front of frame 12, as depicted in FIG. 8. An actuation lever 26 shifts the position of rear member 16 from the primary position to the secondary position as depicted in FIGS. 9-10.

Front member 14 may comprise front wheels 28. Likewise, rear member 16 may comprise rear wheels 30. Front wheels 28 may be pivotable to assist in steering the servicing lift 10. Likewise, rear wheels 30 may be pivotable. Front wheels 28 and rear wheels 30 may also comprise locking devices to prevent pivoting. Front wheels 28 and rear wheels 30 may also comprise a braking mechanism to prevent rolling of the apparatus. To further facilitate movement of the apparatus, embodiments of the apparatus may comprise an upwardly extending handle 32.

Support frame 20 may be raised and lowered by a lift mechanism. For example, a hydraulic lift jacking mechanism comprising a cylinder and ram may be utilized with the cylinder mounted to frame 12, and the ram attached to support frame 20. Alternatively, an electric lift may be utilized. In the embodiment depicted in the figures, a scissor jack 36 is utilized. Scissor jack 36 comprises a base 38 which is secured to interconnected rail members 18. Scissor jack 36 further comprises a screw shaft 42. Screw jack 36 may further comprise interconnected arms 44. As screw shaft 42 is rotated, it operates against a pivot point between the interconnected arms 44 thereby either raising the support frame 20. Screw shaft 42 may either be operated manually, such as with a ratchet device 46, or it may alternatively be operated by a motor. Equipment engagement member 34 may further have ear members 48 which may be utilized to further secure the hopper gate 104, 204 or other heavy equipment located on the underside or side of a rail car.

Embodiments of the servicing lift may further comprise support arms 50. Support arms 50 are pivotally attached to frame member 12. Support arms 50 are particularly helpful in supporting flat bottom gates 204 and other pieces of equipment. Support arms 50 may comprise engagement plates 52 and security chains 54. Engagement plates 52 are configured to engage downwardly facing surfaces 206 of the flat bottom gates 204 and other pieces of equipment. Support arms 50 may be locked into the vertical position with security chain 54 and/or locking pins.

Figure 12:
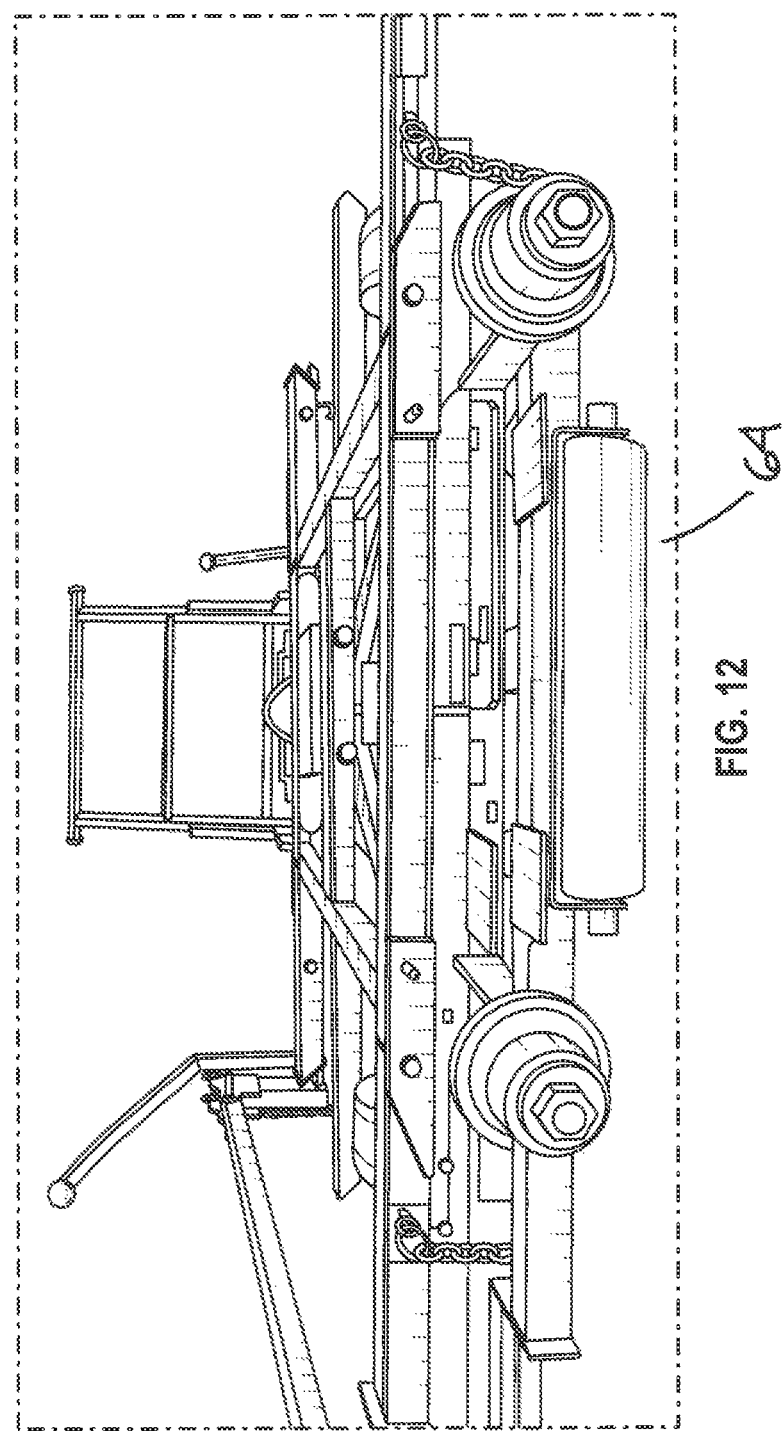
FIG. 12 depicts a front view of an embodiment of the present invention having a roller depending from the frame.
Figure 13:
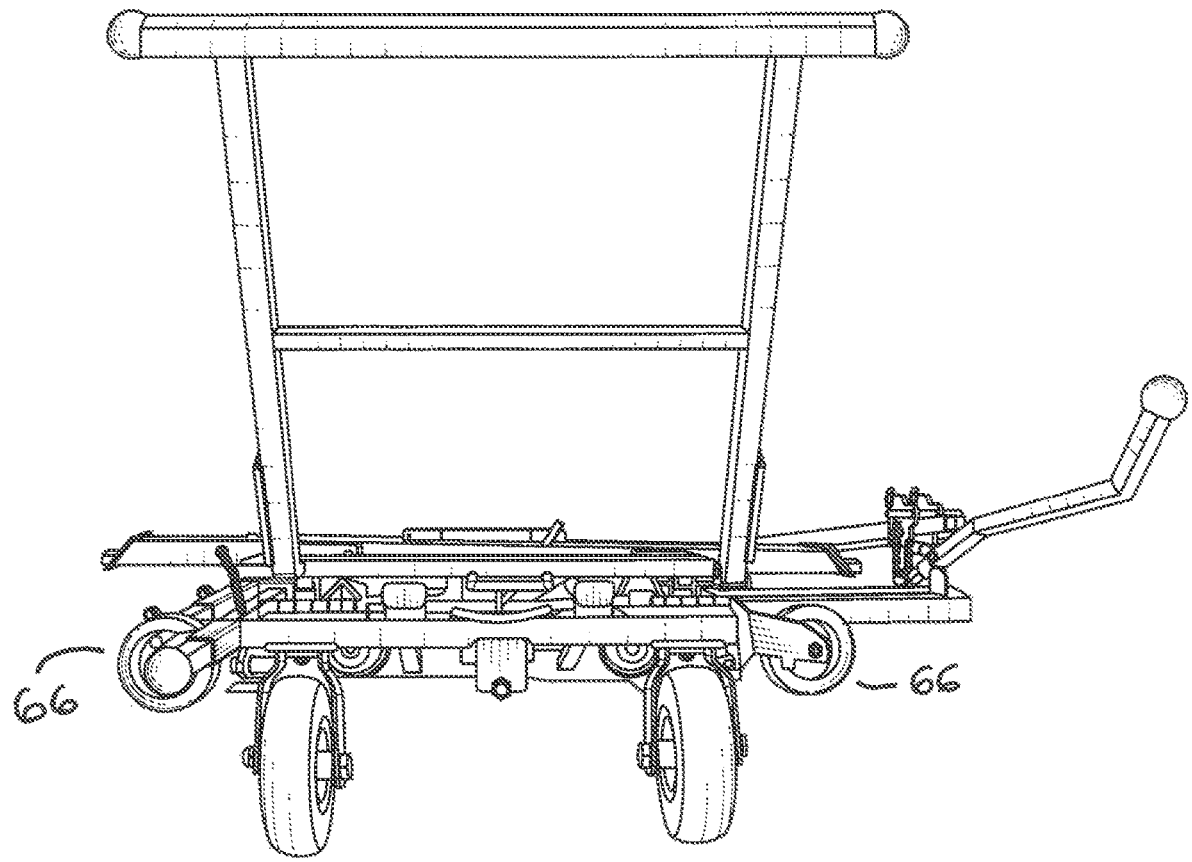
FIG. 13 depicts a rear view of an embodiment of the present invention having pivotable auxiliary wheels attached to the side of the frame, with the wheels in a raised position.
Figure 14:
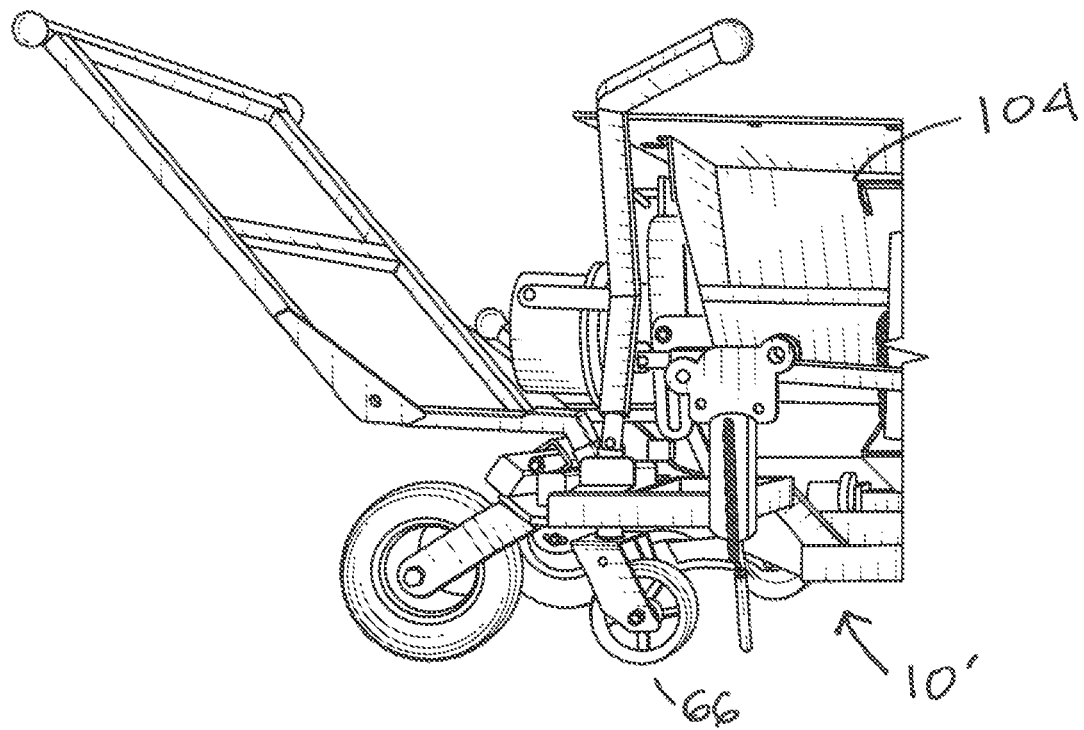
FIG. 14 depicts a side rear view of an embodiment of the present invention carrying a hopper gate, showing an auxiliary wheel in a deployed position.

Embodiments of the apparatus 10 may further comprise forward facing roller members 60. Forward facing members 60 are configured to engage the top surface of an outside rail (i.e., the rail closest to the front of the apparatus) of a railcar track 102, 202. Embodiments of the apparatus may further comprise internal roller members 62 which are similarly configured to engage the top surface of an inside rail. When roller members 60, 62 are thus positioned, the apparatus may move laterally along the railcar track for better positioning. Front member 14 and rear member 16 may comprise rollers, legs, skids or other support structures which support the apparatus when the front member 14 is placed in the second position and the rear member 16 is placed in the lowered position, such as roller 64 as depicted in FIG. 12 and auxiliary wheels 66 depicted in FIGS. 13-14. Auxiliary wheels 66 are pivotable between a raised position and a lowered position for engaging the ground surface. As shown in FIG. 14, auxiliary wheels 66 may be deployed on a servicing lift 10' to provide additional stability and mobility when transporting a hopper gate 104.

Figure 5:
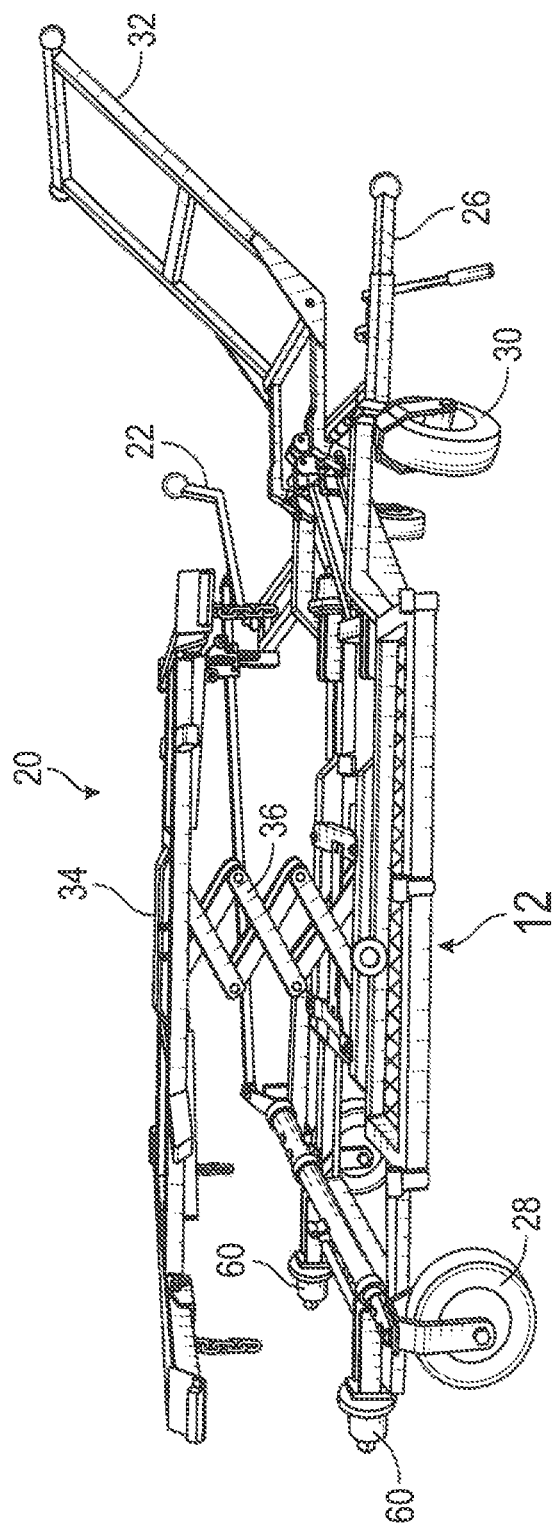
FIG. 5 depicts a side view of an embodiment of the present invention with the support frame in a raised position.
Figure 6:
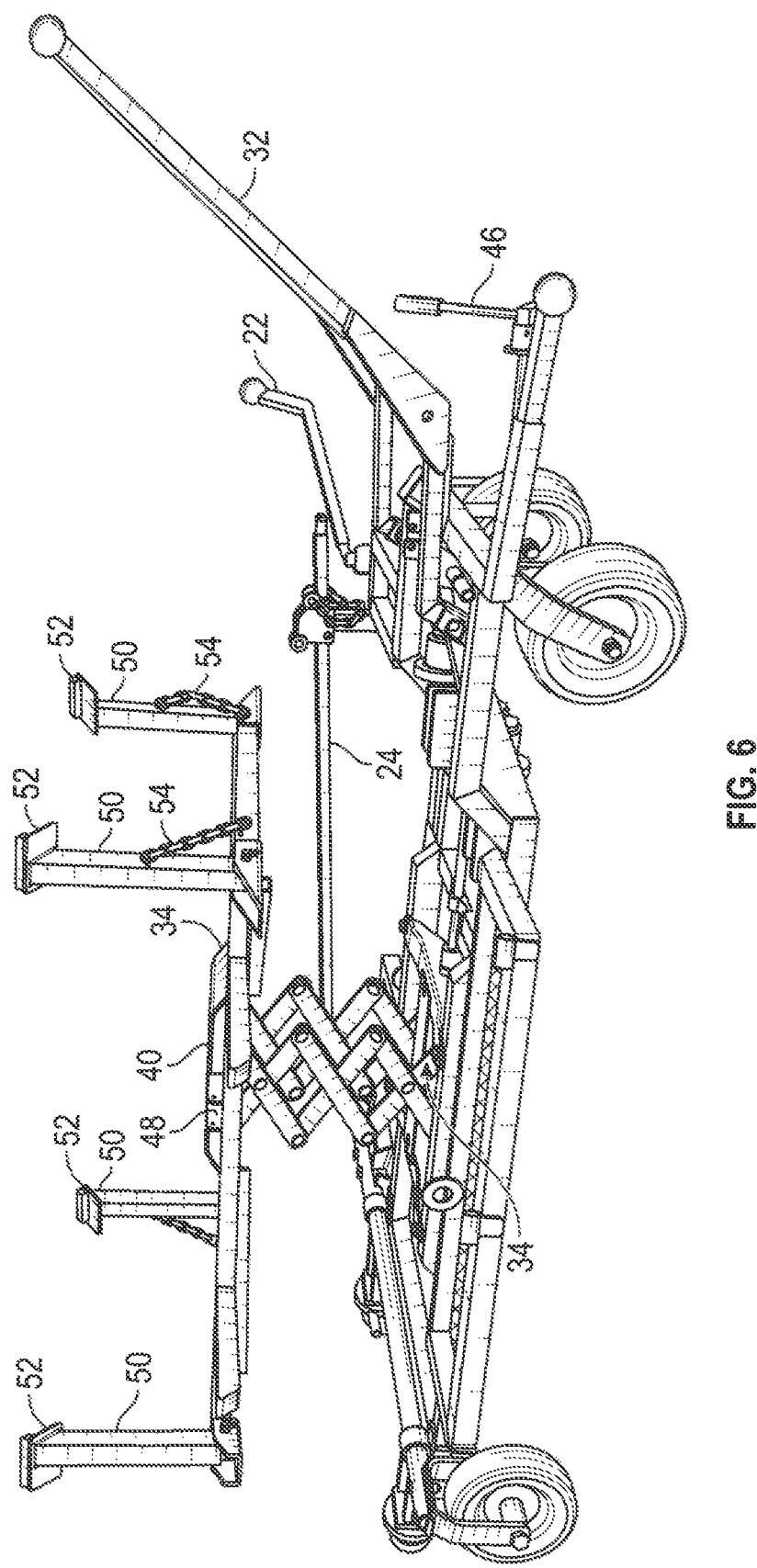
FIG. 6 depicts an oblique side view of an embodiment of the present invention being position with the support frame in a raised position, with vertical side supports in a raised position.
Figure 7:
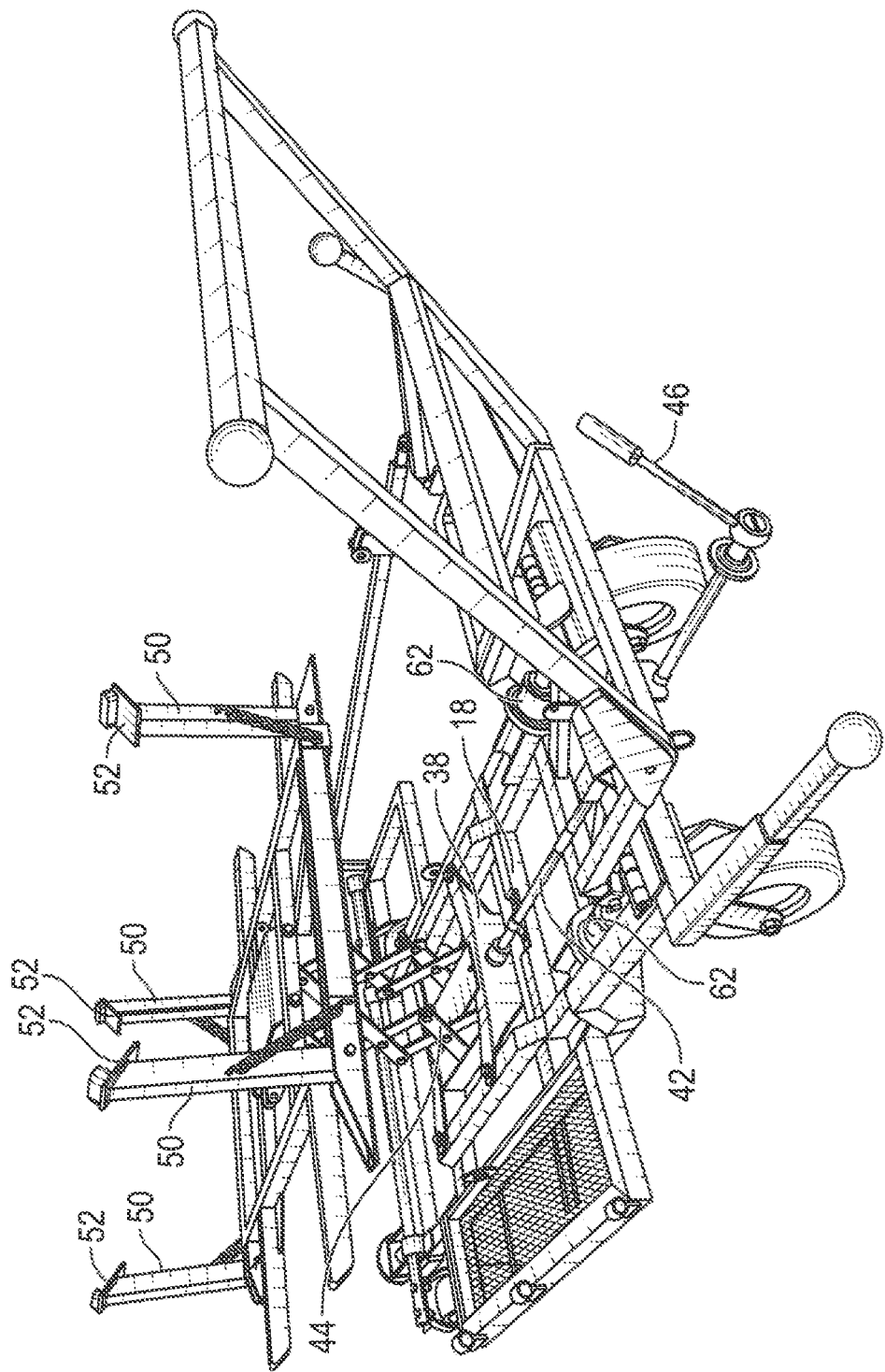
FIG. 7 depicts an oblique rear side view of an embodiment of the present invention being position with the support frame in a raised position, with vertical side supports in a raised position.

Embodiments of the disclosed apparatus 10 will typically be moved around with the support frame in the lowered position, as shown in FIG. 3. In order to get the apparatus 10 in the space between the bottom of the rail car such as between hopper gate 106, 206 and the track rails 102, 202, front member 14 is pivoted into the second position. In the embodiment depicted in FIG. 8, this is accomplished by pushing forward on actuation lever 22, which utilizes linkage 24 which rotates front member 14. In this position, embodiments of the device are typically low enough for the front of the device to be pushed under hopper gate 106, 206 or the bottom of the rail car. Once in position, support frame 20 is elevated as indicated in FIG. 5. While FIG. 5 shows the front member 14 in the first position, which may be possible once the front of the apparatus clears the hopper gate 106, 206, support frame 20 can be raised with front member 14 and rear member 16 in a variety of positions as indicated in the figures. If desired, hopper gate 106, 206 or other piece of equipment may be completely dropped from the rail car 100, 200 and supported by the apparatus. Once the piece of equipment is completely removed, the front member 14 and rear member 16 can be positioned as indicated in FIG. 3, and the piece of equipment transported as desired for additional maintenance.

Embodiments of the disclosed apparatus may be utilized in a method of supporting a piece of equipment beneath or on the side of a railroad car. In this method, an embodiment of the servicing lift 10 is manipulated into position beneath the piece of equipment. A support frame of the apparatus, the support frame being selectively raisable and lowerable, is elevated until an upwardly facing surface of an equipment engagement member comes into contact with a downwardly facing surface of the piece of equipment. The support frame may be locked into the elevated position and the piece of equipment may be further secured to the support frame with chains, cable or other attachment mechanisms.

Having thus described the preferred embodiment of the invention, what is claimed as new and desired to be protected by Letters Patent includes the following:

1. An apparatus for supporting a heavy piece of equipment attached to a rail car, the apparatus comprising: a frame comprising a front member, a rear member, and a plurality of interconnected rail members, wherein the front member is selectively pivotable from a first position to a second position, and the rear member is selectively pivotable from a primary position to a secondary position; a support frame connected to the frame, wherein the support frame is selectively raisable and lowerable between a lowered position adjacent to the frame to a raised position extending upwardly above the frame; an equipment engagement member mounted to the raisable support frame, the equipment engagement member comprising an upwardly facing surface which is adapted to engage a downwardly facing surface of the heavy piece of equipment when the support frame is in the raised position; a first actuation mechanism for moving the front member from the first position to the second position, and from the second position to the first position; and a second actuation mechanism for moving the rear member from the primary position to the secondary position, and from the secondary position to the primary position.

2. The apparatus of claim 1 wherein the front member and the rear member each comprise a pair of ground engaging wheels.

3. The apparatus of claim 1 further comprising an upwardly extending handle attached to the frame adjacent to the rear member.

4. The apparatus of claim 1 wherein the support frame is raised and lowered by a jack having a base attached to the frame, the jack further comprising lower arms attached to the base and upper arms attached to the support frame.

5. The apparatus of claim 4 wherein the jack further comprises a screw member which, upon rotation of the screw member, the upper arms are raised relative to the base.

6. The apparatus of claim 3 wherein the first actuation mechanism comprises a first pivoting lever, the first pivoting lever having a first handle adjacent to the upwardly extending handle.

7. The apparatus of claim 3 wherein the second actuation mechanism comprises a second pivoting lever, the second pivoting lever having a second handle adjacent to the upwardly extending handle.

8. The apparatus of claim 1 wherein the frame comprises rollers configured to roll upon a railroad rail.

9. The apparatus of claim 1 wherein the frame comprises a support arm which is pivotable from a first position adjacent to the plurality of interconnected rail members to a second position wherein an end of the support arm is adjacent to the support frame in the raised position.

10. A method of supporting a piece of heavy equipment attached to a rail car utilizing the apparatus of claim 1 comprising the following steps: pivoting the front member from the first position to the second position; positioning the apparatus such that the equipment engagement member is substantially beneath the piece of heavy equipment; and raising the support frame to the raised position until the upwardly facing surface of the equipment engagement member is in contact with the downwardly facing surface of the piece of heavy equipment.

11. An apparatus for supporting a piece of equipment attached to a rail car, the apparatus comprising: a frame comprising a front member comprising a pair of ground engaging wheels, a rear member comprising a pair of ground engaging wheels, and a plurality of interconnected rail members, wherein the front member is selectively pivotable from a first position to a second position, and the rear member is selectively pivotable from a primary position to a secondary position; a support frame connected to the frame, the support frame selectively raisable and lowerable between a lowered position adjacent to the frame to a raised position extending upwardly above the frame, the support frame selectively raisable by operation of a jack, the jack comprising a base member attached to the frame, the jack further comprising lower arms attached to the base member and upper arms attached to the support frame; an equipment engagement member mounted to the raisable support frame, the equipment engagement member comprising an upwardly facing surface which is adapted to engage a downwardly facing surface of the piece of equipment when the support frame is in the raised position; a first actuation mechanism for moving the front member from the first position to the second position, and from the second position to the first position; a second actuation mechanism for moving the rear member from the primary position to the secondary position, and from the secondary position to the primary position; and an upwardly extending handle attached to the frame adjacent to the rear member.

12. The apparatus of claim 11 wherein the jack further comprises a screw member which, upon rotation, raises the upper arms relative to the base.

13. The apparatus of claim 11 wherein the first actuation mechanism comprises a first pivoting lever, the first pivoting lever having a first handle adjacent to the upwardly extending handle.

14. The apparatus of claim 11 wherein the second actuation mechanism comprises a second pivoting lever, the second pivoting lever having a second handle adjacent to the upwardly extending handle.

15. The apparatus of claim 11 wherein the frame comprises a pair of forward facing rollers adapted to roll upon a railroad rail.

16. The apparatus of claim 11 wherein the frame comprises a support arm which is pivotable from a first position adjacent to the plurality of interconnected rail members to a second position wherein an end of the support arm is adjacent to the support frame in the raised position.

17. A method of supporting a piece of equipment attached to a rail car utilizing the apparatus of claim 11 comprising the following steps: pivoting the front member from the first position to the second position; positioning the apparatus such that the equipment engagement member is substantially beneath the piece of equipment; and raising the support frame to the raised position by operation of the jack until the upwardly facing surface of the equipment engagement member is in contact with the downwardly facing surface of the piece of equipment.

18. A method of supporting a piece of equipment attached to a rail car comprising the following steps: positioning a support apparatus beneath the piece of equipment of the rail car, wherein the support apparatus comprises a manually manipulatable frame and a support frame attached to the frame, where the support frame is selectively raisable and lowerable between a lowered position adjacent to the frame to a raised position extending upwardly above the frame, the support frame further comprising an equipment engagement member having an upwardly facing surface which is adapted to engage a downwardly facing surface of the piece of equipment when the support frame is in the raised position; and elevating the support frame to the raised position until the upwardly facing surface of the equipment engagement member is in contact with the downwardly facing surface of the piece of equipment.

19. The method of claim 18 wherein the frame comprises a front member, a rear member, and a plurality of interconnected rail members, wherein the front member is selectively pivotable from a first position to a second position, and the rear member is selectively pivotable from a primary position to a secondary position.

20. The method of claim 19 wherein the front member and the rear member each comprise a pair of ground engaging wheels.

\* \* \* \* \*